United States Patent [19]  [11] 3,903,092
Chapman et al. [45] Sept. 2, 1975

[54] 2-TERTIARYAMINO-1-(BENZO[B]-THIENYL)ETHANOLS

[75] Inventors: Norman Bellamy Chapman; Kenneth Clarke, both of East Yorkshire; Brian Iddon, Lancashire; John William James, Buckinghamshire; Maurice John Hedge, Berkshire, all of England

[73] Assignee: Aspro-Nicholas Limited, Slough Bucks, England

[22] Filed: Oct. 24, 1972

[21] Appl. No.: 300,030

Related U.S. Application Data

[63] Continuation of Ser. No. 107,465, Jan. 18, 1971, abandoned, which is a continuation of Ser. No. 619,960, March 2, 1967, abandoned.

[30] Foreign Application Priority Data

Mar. 3, 1966 United Kingdom................. 9296/66
Jan. 30, 1967 United Kingdom................. 4548/67

[52] U.S. Cl.. 260/293.57; 260/247.1 L; 260/243 R; 260/268 BC; 260/302 R; 260/306.7; 260/309; 260/309.6; 260/309.7; 260/310 R; 260/310 D; 260/326.5 SA; 260/326.82; 260/330.5; 424/267

[51] Int. Cl.................... C07d 29/36; C07d 29/34
[58] Field of Search.. 260/326.82, 293.57, 326.5 SA

[56] References Cited
OTHER PUBLICATIONS

Chapman et al., Journ. Med. Chem., Vol. 9, (1966), pp. 819–823.

*Primary Examiner*—Donald G. Daus
*Assistant Examiner*—Jose Tovar

[57] ABSTRACT

Certain new aminoacetylbenzo[b]thiophens, 1'-hydroxy-2-aminoethyl benzo[b]thiophens and 1'-halogeno-2-aminoethyl benzo[b] thiophens are disclosed and claimed. The compounds have a low toxicity and display anti-5-hydroxytryptamine activity. This activity was determined by the method of Woolley, D.W., *Proc. Soc. Exp. Biol. Med.*, 98, 367, (1958), these compounds giving from 50 to 100% protection against 5-hydroxytryptophan induced diarrhoea. Preferred formulations contain from 0.1 to 500 mg. of active ingredient and up to 3 g. per day may be administered.

9 Claims, No Drawings

2-TERTIARYAMINO-1-(BENZO[B]THIENYL)ETHANOLS

This application is a continuation of Ser. No. 107,465, filed Jan. 18, 1971, which in turn is a continuation of Ser. No. 619,960, filed Mar. 2, 1967 and both now abandoned.

This invention relates to certain new pharmacologically active benzo[b]thiophen compounds, compositions containing them and methods of treatment involving their use.

It has been found in accordance with the present invention that certain benzo[b]thiophens antagonise the action of serotonin, more commonly called 5-hydroxytryptamine and hereinafter referred to as 5HT. 5HT is a naturally occurring amine in the human body and possesses well-defined pharmacological effects. The extent to which these effects perform a normal function is not fully known but in the following conditions 5HT appears to be involved and accordingly the administration of a compound possessing anti-5HT activity should be beneficial.

a. Migraine — Certain highly active anti-5HT compounds, such as methysergide, have been shown to be effective against certain types of migraine and it is reasonable to suppose that in these cases the migraine is due to the vasomotor effect of 5HT.

b. Allergy — The allergic response is mediated by the release of 5HT, histamine and other naturally occurring substances which amongst other properties have the property of constricting smooth muscle. Anti-5HT drugs are therefore of use in the treatment of allergies in general and in particular allergic asthma and skin allergies.

c. Inflammation — 5HT is thought to be involved in the inflammatory response and anti-5HT drugs have, therefore, applications in reducing inflammation.

d. Central nervous system — 5HT occurs widespread in the central nervous system. Whilst its precise role is not known, it is thought to play a part in the functions of the central nervous system. Tranquillising drugs such as reserpine and chlorpromazine possess anti-5HT properties and accordingly anti-5HT drugs have applications as tranquillisers.

e. Cardio-vascular effects — 5HT causes constriction of the peripheral blood vessels in many parts of the body, constricts the vessels of the coronary system and causes a rise in blood pressure. The administration of an anti-5HT drug is therefore indicated where an antihypertensive effect is required.

Certain of the compounds of formula I also exhibit one or more of such effects as an anti-bacterial activity, a monoamine oxidase (M.A.O.) inhibiting effect, or are active as mild analgesics which effects may be additional to or result from the anti-5HT effect.

Accordingly the present invention provides a method of antagonising 5HT activity in an animal (including human) body comprising administering a sufficient dose of at least one compound of the formula:

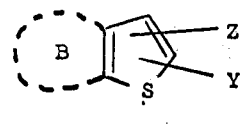

I and acid addition salts thereof, wherein B represents a benzene ring, Y is hydrogen, lower alkyl, lower acyl or Z and Z has the formula:

$$-A - CH_2 - NR^1R^2$$

II wherein A is a keto, hydroxymethylene or halogenomethylene; and $R^1$ and $R^2$, which may be the same or different, are hydrogen, alkyl or together with the adjacent nitrogen form a heterocyclic ring optionally substituted by one or more hetero atoms.

The benzene ring B may be unsubstituted or substituted by one or more of the same or different substituents attached to any position or positions available for substitution in the benzene ring; substituents are, for example, hydroxy; cyano; amino; nitro; trifluoromethyl; halogen; lower alkoxy; lower alkenyloxy; lower alkynyloxy; lower acyl; and lower alkyl, alkenyl and alkynyl optionally substituted by hydroxyl, lower alkoxy, aryl or halogen.

When $R^1$ and/or $R^2$ in formula II is alkyl, that alkyl preferably contains 1 to 12 carbons, may be unsaturated by one or more double or triple bonds and may be unsubstituted or substituted by hydroxyl, halogen, thiohydroxyl or aryl.

The term "lower" in qualifying various groups is used herein to mean those groups containing up to 6 carbon atoms.

Examples of alkoxy radicals are methoxy, ethoxy, n-propoxy, iso-propoxy, n-butoxy, iso-butoxy, s-butoxy, t-butoxy, n-amyloxy (i.e. pentyloxy), iso-amyloxy, s-amyloxy, t-amyloxy, n-hexyloxy, iso-hexyloxy, s-hexyloxy and t-hexyloxy.

Examples of alkenyloxy radicals are vinyloxy, allyloxy, isopropenyloxy, but-1-enyloxy, but-2-enyloxy, pent-2-enyloxy, pent-3-enyloxy, 4,4-dimethylbut-1-enyloxy, hex-1-enyloxy, hex-3-enyloxy, hex-1,3-dienyloxy, 3-ethylbut-1-enyloxy, hexa-1,3-dien-5-ynyloxy and 3-vinylbut-2-enyloxy.

Examples of alkynyloxy radicals are ethynyloxy, prop-2-ynyloxy, prop-1-ynyloxy, but-1-ynyloxy, but-2-ynyloxy, 3,3-dimethylprop-1-ynyloxy, 1-methylpent-2-en-4-ynyloxy, pent-3-ynyloxy, pent-2,4-ynyloxy, 3-ethylbut-4-en-1-ynyloxy and 2-ethynylbut-3-ynyloxy.

Examples of acyl radicals are acetyl, n-propionyl, iso-propionyl, n-butyryl, iso-butyryl, s-butyryl, t-butyryl, n-valeryl, iso-valeryl, s-valeryl and t-valeryl.

Examples of alkyl radicals are methyl, ethyl, n-propyl, n-butyl, n-amyl, n-hexyl, n-heptyl, n-octyl, n-nonyl, n-decyl, n-undecyl, n-dodecyl and the various positional isomers thereof such as iso-propyl, iso-butyl s-butyl, t-butyl, iso-amyl, s-amyl, t-amyl, iso-hexyl, s-hexyl, t-hexyl, t-heptyl, iso-octyl, 2-ethylhexyl, t-octyl, 3-t-butylpentyl, t-nonyl and t-decyl.

Examples of alkyl radicals unsaturated by one or more double or triple bonds (i.e. alkenyl and alkynyl radicals) are ethenyl, ethynyl, prop-1-enyl, prop-2-enyl (i.e. allyl), isopropenyl, prop-1-ynyl, prop-2-ynyl, but-1-enyl, but-1-ynyl, but-2-enyl, but-2-ynyl, but-3-enyl, iso-but-1-enyl, iso-but-2-enyl, s-but-1-enyl, s-but-1-ynyl, s-but-2-ynyl, pent-1-enyl, pent-2-enyl, pent-3-enyl, pent-4-enyl, pent-1-ynyl, pent-2-ynyl, pent-3-ynyl pent-4-ynyl, 2-methylbut-1-enyl, 3-methylbut-1-ynyl, 2-methylbut-2-enyl, 1,1-dimethylprop-2-enyl, hex-1-enyl, hex-1-ynyl, hex-2-enyl, hex-2-ynyl, hex-3-enyl, hex-3-ynyl, hex-4-enyl, hex-4-ynyl, hex-5-enyl, hex-5- ynyl, 3,3-dimethylbut-1-enyl, 3-ethylbut-1-ynyl, 2,3-dimethylbut-1-enyl, 2,3-dimethylbut-2-enyl, 2,3-dimethylbut-3-enyl, 3-methyl-3-ethylprop-1-ynyl, 1-methyl-1-ethylprop-2-enyl, pent-1,3-dienyl, hex-1,4-dienyl, hexa-1,3-dien-5-ynyl, pent-3-en-1-ynyl, pent-1-en-4-ynyl, buta-1,3-dienyl, pent-2-en-4-ynyl, 2,3-dimethylbuta-1,3-dienyl; and similarly the various positional isomers of heptenyl, heptynyl, octenyl, octynyl, nonenyl, nonynyl, decenyl and decynyl.

Examples of alkyl, alkenyl and alkynyl radicals substituted by one or more hydroxyl or thiohydroxyl radicals are 2-hydroxyethyl, 2-hydroxypropyl, 2-thiohydroxyethyl, 2-thiohydroxypropyl, 3-hydroxypropyl, 4-hydroxybutyl, 4-thiohydroxybutyl, 5-hydroxyamyl, 4-hydroxyamyl, 4-thiohydroxyamyl, 4-hydroxyhexyl, 6-hydroxyhexyl, 6-thiohydroxyhexyl and various positional isomers thereof such as 1-methyl-2-hydroxyethyl, 2-methyl-3-hydroxypropyl, 2-methyl-3-thiohydroxypropyl, 2-hydroxymethyl-3-hydroxypropyl, 1-methyl-3-hydroxypropyl, 3-methyl-4-hydroxybutyl, 3-methyl-4-thiohydroxybutyl, 3-methyl-5-hydropentyl; 3-methyl-5-thiohydroxypentyl, 2-hydroxymethyl-5-hydroxypentyl; 2-hydroxyethenyl, 3-hydroxyprop-1-enyl, 3-thiohydroxyprop-1-enyl, 1-methyl-2-hydroxyvinyl, 4-hydroxybut-1-ynyl, 4-thiohydroxybut-2-ynyl, 5-hydroxypent-1-enyl, 5-hydroxypent-1-ynyl, 5-hydroxypent-2-ynyl, 5-thiohydroxypent-2-enyl, 5-thiohydroxypent-3-ynyl, 2-hydroxymethylbut-1-enyl, 3-hydroxymethyl-4-hydroxybut-1-ynyl, 2-thiohydroxymethylbut-2-enyl, 1,1-dihydroxymethylprop-2-enyl, 6-thiohydroxyhex-1-enyl, 6-thiohydroxyhex-2-ynyl, 3,3-dihydroxymethylbut-1-enyl, 3-(2-hydroxyethyl) but-1-ynyl, 3-hydroxymethyl-3-(2'-hydroxyethyl) prop-1-ynyl, 5-hydroxypent-1,3-dienyl, 6-thiohydroxyhex-1,4-dienyl, 6-hydroxyhex-1-en-3-ynyl, 4-hydroxybuta-1,3-dienyl, and 5-thiohydroxypent-2-en-4-ynyl.

Examples of alkyl radicals substituted by one or more halogen atoms are 2-chloroethyl, 2-bromoethyl, 2-iodoethyl, 2-fluoroethyl, 2-chloropropyl, 3-bromopropyl, 3-fluoropropyl, 3-chlorobutyl, 5-bromoamyl, 4-trifluoromethylbutyl, 6-iodohexyl, 6-chlorohexyl, 1-trifluoromethylethyl, 2-bromomethyl-3-bromopropyl, 1-methyl-3-chloropropyl, 3-trifluoromethylbutyl, 3-methyl-5-iodopentyl, 2-bromomethyl-5-bromopentyl.

Examples of alkyl, alkenyl and alkynyl radicals substituted by one or more lower alkoxy radicals are 2-ethoxyethyl, 2-butoxyethyl, 3-methoxypropyl, 3-t-butoxypropyl, 4-ethoxybutyl, 5-iso-propoxyamyl, 4-methoxyhexyl, 6-ethoxyhexyl, 1-methyl-2-methoxyethyl, 2-methyl-3-ethoxypropyl, 2,3-diethoxypropyl, 1-methyl-3-t-butoxypropyl, 3-methyl-4-ethoxybutyl, 3-methoxy-5-ethoxypentyl, 5-isobutoxypentyl, 6-ethoxyhexyl, 2-ethoxyethenyl, 2-ethoxyethynyl, 3-methoxyprop-1-enyl, 1-methyl-2-ethoxyvinyl, 4-n-butoxybut-1-ynyl, 4-ethoxybut-2-ynyl, 5-ethoxypent-1-enyl, 5-iso-propoxypent-2-enyl, 5-vinyloxypent-3-ynyl, 2-ethoxybut-1-enyl, 3,4-dimethoxybut-1-enyl, 1,1-dimethoxymethylprop-2-enyl, 6-ethoxyhex-2-ynyl, 6-ethoxyhex-4-ynyl, 3-(2'-ethoxyethyl) but-1-ynyl, 5-n-butoxypent-1,3-dienyl, 6-methoxyhex-1,4-dienyl, 6-ethoxyhex-1-en-2-ynyl, 4-ethoxymethylpenta-1,3-dienyl and 5-ethoxypent-2-en-4-ynyl.

Examples of alkyl, alkenyl and alkynyl radicals substituted by one or more aryl radicals are benzyl, cinnamyl, phenethyl, styryl, trityl, o-tolylmethyl, m-tolylmethyl, p-tolylmethyl, 2,3-xylylmethyl, 2,4-xylylmethyl, 2,5-xylylmethyl, 3,4-xylylmethyl, 3,5-xylylmethyl, o-cumenylmethyl, m-cumenylmethyl, p-cumenylmethyl, mesitylmethyl, 2,4-dimethoxybenzyl, 2,3,6-trimethoxybenzyl, α-naphthylmethyl, β-naphthylmethyl, α-phenylpropyl, γ-phenylpropyl, β-phenylisopropyl, 4-phenylbutyl, 4-(o-tolyl) butyl, 3-(2',3'-xylyl) butyl, 4-(3',4'-xylyl) butyl, 4-(m-cumenyl)butyl, 4-(2',4'-dimethoxyphenyl) butyl, 4-(α-naphthyl) butyl, 3-(α.naphthyl)butyl, 1-methyl-2-phenylethyl, 5-phenylamyl, 6-phenylhexyl, 2-methyl-3-phenylpropyl, 1-methyl-3-(α-naphthyl) propyl, 3-methyl-5-phenylpentyl, 2-mesitylpentyl, 4-phenylbut-1-enyl, 4-(β-naphthyl)but-2-enyl, 4-(o-tolyl)but-1-ynyl, 5-phenylpent-2-enyl, 5-phenylpent-2-ynyl, 5-(β-naphthyl)pent-3-ynyl, 2-benzylbut-1-enyl, 3,3-dibenzylbut-1-ynyl, 3-(β-naphthyl) prop-1-enyl, 5-benzylpent-1,3-dienyl, 6-tritylhex-1,4-dienyl, 6-phenylhex-1-en-3-ynyl, 4-(m-cumenyl) buta-1,3-dienyl and 5-(β-naphthyl) pent-2-en-4-ynyl.

Examples of $R^1$ and $R^2$ together with the adjacent nitrogen forming a heterocyclic ring are imidazolidinyl, imidazolinyl, pyrazolidinyl, pyrazolinyl, piperidyl (i.e. piperidino), homopiperidyl, thiazolinyl, thiazolyl, homopiperazinyl, homomorpholinyl, piperazinyl, morpholinyl (i.e. morpholino), thiazinyl, thiazolidinyl, pyrrolyl, imidazolyl, pyrazolyl, pyrrolidinyl (i.e. pyrrolidino) and pyrrolinyl.

More especially, the benzo[b]thiophen compounds for use in the present invention have the formula:

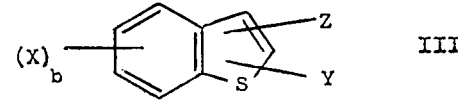

wherein $(X)_b$ represents one or more of the same or different substituents; X is hydrogen, lower alkoxy, hydroxyl, halogen, trifluoromethyl, amino, nitro, or lower alkyl optionally substituted by hydroxyl, aryl or halogen; b is an integer from 1 to 4; Y is hydrogen, lower alkyl or Z; Z is a group of formula II wherein A is as defined above; and $R^1$ and $R^2$, which may be the same or different, are hydrogen; lower alkyl, lower alkenyl, or lower alkynyl optionally substituted by hydroxyl, halogen or aryl; or together with the adjacent nitrogen, form a heterocyclic ring of 5 to 7 ring atoms optionally substituted by one or more oxygen, nitrogen or sulphur atoms.

A particularly preferred group of compounds for use in the present invention have the formula:

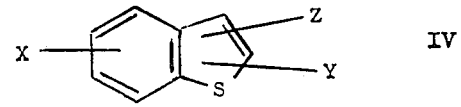

wherein X is halogen, methyl, ethyl, n-propyl, iso-propyl, n-butyl, iso-butyl, s-butyl, t-butyl, trifluoromethyl, 4,5,6,7-tetrafluoro, nitro, amino or hydrogen; Y is hydrogen or Z; Z is a group of formula II wherein A is as defined above; and $R^1$ and $R^2$, which may be the same or different, are hydrogen, methyl, ethyl, n-propyl, iso-propyl, n-butyl, iso-butyl, s-butyl, t-butyl, ethynyl, prop-1-enyl, prop-2-enyl, prop-1-ynyl, prop-2-ynyl, but-1-enyl, but-2-enyl, but-3-enyl, but-1-ynyl, but-2-ynyl, but-3-ynyl, benzyl, phenethyl, phenopropyl, phenobutyl, halogenomethyl, 2-halogenoethyl, 3-halogenopropyl or 4-halogenobutyl; or together with the adjacent nitrogen form a pyrrolidinyl, piperidyl or morpholinyl group.

Salts of the compounds for use in this invention are particularly acid addition salts, such as the pharmaceutically acceptable, non-toxic addition salts with suitable acids, such as those with inorganic acids, for example hydrochloric, hydrobromic, nitric, sulphuric or phosphoric acids, or with organic acids, such as organic carboxylic acids, for example, glycollic, maleic, hydroxymaleic, malic, tartaric, citric, salicyclic, o-acetyloxybenzoic, nicotinic or isonicotinic acid, or organic sulphonic acids, for example methane sulphonic, ethane sulphonic, 2-hydroxyethane sulphonic, toluene-p-sulphonic or naphthalene-2-sulphonic acid. Apart from pharmaceutically acceptable acid addition salts, other salts are also included within the scope of acid addition salts such as, for example, those with picric and oxalic acid; they may serve as intermediates in the purification of the compounds or in the preparation of other, for example pharmaceutically acceptable, acid addition salts, or are useful for identification, characterization or purification of the bases.

A resulting acid addition salt may be converted into the free compound according to known methods, for example, by treating it with a base, such as with a metal hydroxide or alkoxide, for example, an alkali metal or alkaline earth metal hydroxide, for example, lithium hydroxide, sodium hydroxide, potassium hydroxide or calcium hydroxide; with a metal carbonate, such as an alkali metal or an alkaline earth metal carbonate or hydrogen carbonate, for example sodium, potassium or calcium carbonate or hydrogen carbonate; with ammonia; or with a hydroxyl ion exchange preparation, or with any other suitable reagent.

A resulting acid addition salt may also be converted into another acid addition salt according to known methods; for example, a salt with an inorganic acid may be treated with a metal salt, for example a sodium, barium or silver salt, of an acid in a suitable diluent, in which a resulting inorganic salt is insoluble and is thus removed from the reaction medium. An acid addition salt may also be converted into another acid addition salt by treatment with an anion exchange preparation.

Specific compounds which are useful in the present invention are
2-(1'-Chloro-2'-pyrrolidinoethyl)-5-bromobenzo[b]thiophen;
2-(1'-Hydroxy-2'-morpholinoethyl)-5-chlorobenzo[b]thiophen;
2-(1'-Chloro-2'-morpholinoethyl)-5-chlorobenzo[b]thiophen;
2-(1'-Hydroxy-2'-morpholinoethyl)-5-bromobenzo[b]thiophen;
2-(1'-Chloro-2'-morpholinoethyl)-5-bromobenzo[b]thiophen;
2-(1'-Hydroxy-2'-diethylaminoethyl)-5-chlorobenzo[b]thiophen;
2-(1'-Hydroxy-2'-diethylaminoethyl)-5-bromobenzo[b]thiophen;
2-(1'-Hydroxy-2'-dibenzylaminoethyl)-5-chlorobenzo[b]thiophen;
2-(1'-Hydroxy-2'-dibenzylaminoethyl)-5-bromobenzo[b]thiophen;
2-(1'-Hydroxy-2'-piperidinoethyl)-5-bromobenzo[b]thiophen;
3-Piperidinoacetyl benzo[b]thiophen;
3-Pyrrolidinoacetyl benzo[b]thiophen;
3-Dimethylaminoacetyl benzo[b]thiophen;
3-Dibenzylaminoacetyl benzo[b]thiophen;
3-Morpholinoacetyl benzo[b]thiophen;
3-Diethylaminoacetyl benzo[b]thiophen;
2-Dimethylaminoacetyl-5-chlorobenzo[b]thiophen;
2-Diethylaminoacetyl-5-chlorobenzo[b]thiophen;
2-Pyrrolidinoacetyl-5-chlorobenzo[b]thiophen;
2-Morpholinoacetyl-5-chlorobenzo[b]thiophen;
2-Dibenzylaminoacetyl-5-chlorobenzo[b]thiophen;
2-Dimethylaminoacetyl-5-bromobenzo[b]thiophen;
2-Diethylaminoacetyl-5-bromobenzo[b]thiophen;
2-Pyrrolidinoacetyl-5-bromobenzo[b]thiophen;
2-Piperidinoacetyl-5-bromobenzo[b]thiophen;
2-Morpholinoacetyl-5-bromobenzo[b]thiophen;
2-Dibenzylaminoacetyl-5-bromobenzo[b]thiophen;
3-(1'-Bromo-2'-thiazolidinylethyl)-5-s-hexyloxybenzo[b]thiophen
3-(1'-Fluoro-2'-phenopropylaminoethyl)-6-allyloxybenzo[b]thiophen
3-(1'-Iodo-2'-[N-methyl-N-prop-2-ynylamino]ethyl)-5-nitrobenzo[b]thiophen
3-(1'-Hydroxy-2'-dimethylaminoethyl)benzo[b]thiophen;
3-(1'-Chloro-2'-dimethylaminoethyl)benzo[b]thiophen;
3-(1'-Hydroxy-2'-piperidinoethyl)benzo[b]thiphen;
3-(1'-Hydroxy-2'-pyrrolidinoethyl)benzo[b]thiophen;
3-(1'-Hydroxy-2'-morpholinoethyl)benzo[b]thiophen;
3-(1'-Hydroxy-2'-dibenzylaminoethyl)benzo[b]thiophen;
3-(1'-Hydroxy-2'-diethylaminoethyl)benzo[b]thiophen;
2-(1'-Hydroxy-2'-dimethylaminoethyl)-5-chlorobenzo[b]thiophen;
2-(1'-Chloro-2'-dimethylaminoethyl)-5-chlorobenzo[b]thiophen;
2-(1'-Hydroxy-2'-dimethylaminoethyl)-5-bromobenzo[b]thiophen;
2-(1'-Chloro-2'-dimethylaminoethyl)-5-bromobenzo[b]thiophen;
2-(1'-Hydroxy-2'-pyrrolidinoethyl)-5-chlorobenzo[b]thiophen;
2-(1'-Chloro-2'-pyrrolidinoethyl)-5-chlorobenzo[b]thiophen;
2-(1'-Hydroxy-2'-pyrrolidinoethyl)-5-bromobenzo[b]thiophen;
2,3-Bis-(1'-Hydroxy-2'-dibutylaminoethyl)-5-cinnamylbenzo[b]thiophen
2,3-Bis(1'-chloro-2'-di-t-butylaminoethyl)-5-(2-ethoxyethyl)benzo[b]thiophen
2,3-Bis(1'-chloro-2'-dimethylaminoethyl)-5,6-diethoxybenzo[b]thiophen
3-(1'-Chloro-2'-homopiperazinylethyl)-4,5,6,7-tetrafluorobenzo[b]thiophen
3-(1'-Hydroxy-2'-di-isopropylaminoethyl)-6-(2,3-xylylmethyl)benzo[b]thiophen
3-(1'-Hydroxy-2'-dimethylaminoethyl)-5-(3-α-naphthylpropyl)benzo[b]thiophen
3-(1'-Bromo-2'-dibenzylaminoethyl)-6-tritylbenzo[b]thiophen
3-(N-Thiohydroxymethyl-N-2'-chloroethylaminoacetyl)5-t-butoxybenzo[b]thiophen
2-Ethyl-3-pyrrolidinoacetyl-6-(5'-hydroxyamyl)benzo[b]thiophen 2-Butyryl-3-diethylaminoacetyl-5,7-dichlorobenzo[b]thiophen
3-(N-Ethyl-N-prop-2-ynylaminoacetyl)-6-methylbenzo[b]thiophen
3-Iso-propyl-2-dibenzylaminoacetyl-5-fluorobenzo[b]thiophen
2,3-Bis-dimethylaminoacetyl-5-t.-butylbenzo[b]thiophen
2-(1'-Fluoro-2'-pyrrolidinoethyl)-3-methyl-5-fluorobenzo[b]thiophen
2-(1'-Chloro-2'-dibutylaminoethyl)-3-propyl-5-fluorobenzo[b]thiophen The compounds of the present invention will normally be administered in the form of pharmaceutical compositions comprising as an essential ingredient at least one active compound of formula I in association with at least one pharmaceutically acceptable carrier therefor.

The compounds or compositions of the present invention may be administered by various routes and for this purpose may be formulated in a variety of forms. Thus the compounds or compositions may be administered by the oral and rectal routes, topically, by injection and by continuous or discontinuous intraarterial infusion in the form of, for example, tablets, sachets, cachets, elixirs, suspensions, aerosols, ointments, capsules, suppositories, injection solutions and suspensions in physiologically acceptable media, and sterile packaged powders for making injection solutions. Advantageously for this purpose, compositions may be provided in dosage unit form, preferably each dosage unit containing from 0.1 to 500 mg. (from 1.0 to 75 mg. in the case of parenteral administration, from 0.1 to 5.0 mg. in the case of inhalation and from 1.0 to 500 mg. in the case of oral or rectal administration) of a compound of formula I. Up to 2 or even 3 grams per day of active ingredient may be administered.

It will, of course, readily be understood that the amount of the compound or compounds of formula I actually to be administered will be determined by a physician in the light of all the relevant circumstances including the condition to be treated, the choice of compound to be administered and the choice of route of administration and therefore the above preferred dosage range is not intended to limit the scope of the present invention in any way.

In this Specification, the expression "dosage unit form" is used as meaning a physically discrete unit containing an individual quantity of the active ingredient; generally in admixture with a pharmaceutical diluent therefor or otherwise in association with a pharmaceutical carrier, the quantity of the active ingredient being such that one or more units are normally required for a single therapeutic administration or that, in the case of severable units such as scored tablets, at least one fraction such as a half or a quarter of a severable unit is required for a single therapeutic administration.

The formulations of the present invention normally will consist of at least one compound of formula I mixed with a carrier, or diluted by a carrier, or enclosed or encapsulated by an ingestible carrier in the form of a capsule, sachet, cachet, paper or other container or by a disposable container such as an ampoule. A carrier or diluent may be a solid, semi-solid or liquid material, which serves as a vehicle, excipient or medium for the active therapeutic substance.

Some examples of the diluents or carriers which may be employed in the pharmaceutical compositions of the present invention are lactose, dextrose, sucrose, sorbitol, mannitol, propylene glycol, liquid paraffin, white soft paraffin, kaolin, microcrystalline cellulose, calcium silicate, silica, polyvinylpyrrolidene, cetostearyl alcohol, starch, gum acacia, calcium phosphate, cocoa butter, oil of theobroma, arachis oil, alginates, tragacanth, gelatin, syrup B.P., methyl cellulose, polyoxyethylene sorbitan monolaurate, ethyl lactate, methyl- and propylhydroxybenzoate, sorbitan trioleate, sorbitan sesquioleate and oleyl alcohol and propellants such as trichloromonofluoromethane, dichlorodifluoromethane and dichlorotetrafluoromethane. In the case of tablets, a lubricant may be incorporated to prevent sticking and binding of the powdered ingredients in the dies and on the punch of the tabletting machine. For such purpose there may be employed for instance aluminium, magnesium or calcium stearates, talc or mineral oil.

The compounds of formula I are novel compounds and accordingly form a part of this invention. They may be prepared by a process characterised in that a compound of the formula:

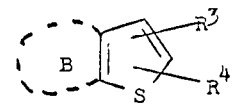

V wherein B is as defined in formula I, $R^4$ is hydrogen, lower alkyl, lower acyl or $R^3$, and $R^3$ is a 1,2-epoxyethylgroup or a group of the formula:

$$- CO - CH_2 - Hal$$

VI wherein Hal represents halogen, is a. when $R^3$ is 1,2-epoxyethyl, reacted with an amino compound of the formula:

$$H - NR^1R^2$$

VII wherein $R^1$ and $R^2$ are as defined in formula I, in the presence of a solvent such as, for example, benzene or ether, or mixtures of such solvents, to produce a compound of the formula:

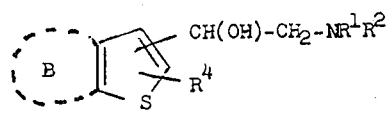

VIII wherein B, $R^1$, $R^2$ and $R^4$ are as defined above; and b. when $R^3$ is a group of formula VI, reacted with an amino compound of formula VII in the presence of a solvent such as, for example, benzene or ether, or mixtures of such solvents, to produce a compound of the

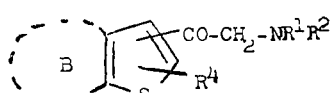

IX wherein B, $R^1$, $R^2$ and $R^4$ are as defined above;

and thereafter where a compound of formula I in which Z is a group of formula II and A is a hydroxymethylene radical is required, and has not been obtained as described above (i.e. method (b) has been used), reducing the corresponding compound of formula IX using a reducing agent such as, for example, sodium borohydride, in the presence of a solvent such as, for example, methanol to produce a compound of formula VIII above;

and thereafter, where a compound of formula I in which Z is a group of formula II and A is a halogenomethylene radical is required, reacting the corresponding compound of formula VIII, however made, with a halogenating agent such as, for example, thionyl chloride, phosphorus tribromide or tri-iodide in the presence or absence of an inert solvent such as, for example, chloroform to produce a compound of the formula:

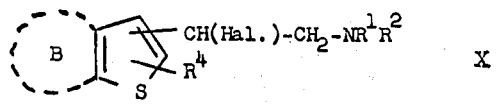
X wherein B, $R^1$, $R^2$, $R^4$ and Hal are as defined above.

The compounds of formula V wherein $R^3$ is a 1,2-epoxyethyl group may be prepared by reduction of the corresponding compound in which $R^3$ is a group of formula VI and Hal. is, preferably, bromine, using a reducing agent such as, for example, sodium borohydride, in the presence of a base such as sodium hydroxide.

The compounds of formula V in which $R^3$ is a group of formula VI in the 3-position, may be prepared by reacting a compound of the formula:

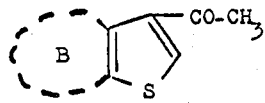
XI wherein B is as defined in formula I, with a halogenating agent such as, for example, chlorine, sulphuryl chloride, bromine or N-bromosuccinimide in the presence of a solvent such as, for example, carbon disulphide or carbon tetrachloride.

The compounds of formula XI may be readily obtained by conventional acetylation of the required benzo[b]thiophen nucleus using, for example, acetyl chloride and aluminium chloride in the presence of a solvent such as, for example, carbon disulphide.

The compounds of formula V in which $R^3$ is a group of formula VI in the 2-position may be prepared by reacting a compound of the formula:

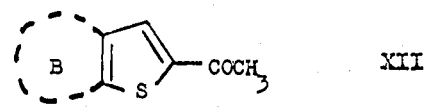
XII wherein B is as defined in formula I, with a halogenating agent such as, for example, bromine or sulphuryl chloride in the presence of a solvent such as, for example, carbon disulphide or carbon tetrachloride.

The compounds of formula XII may in turn be prepared by reacting a compound of the formula:-

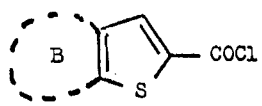
XIII wherein B is as defined in formula I, with diethyl malonate in the presence of magnesium turnings, followed by hydrolysis of the resultant product.

The compounds of formula XIII may be prepared from the corresponding 2-carboxylic acid by reaction with thionyl chloride, the 2-carboxylic acid being in turn prepared by hydrolysis of the corresponding compound of the formula:-

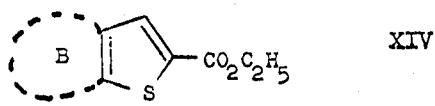
XIV wherein B is as defined in formula I.

The compounds of formula XIV, wherein B is a benzene ring substituted by a nitro group, may be prepared by reacting a compound of the formula:-

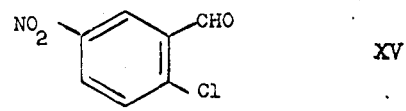
XV with ethyl thioglycollate in the presence of an alkali metal alkoxide such as, for example, sodium ethoxide.

The compounds of formula XIV wherein B is a benzene ring substituted by a group other than nitro, may be prepared from the corresponding nitro compound by conventional methods. Thus, for example, an amino substituent may be obtained by reduction of the corresponding nitro group using, for example, hydrazine hydrate and Raney nickel. Amino groups so formed may in turn be converted to halogen groups by conventional methods.

The following Examples further illustrate the invention.

EXAMPLE 1

To 3-chloroacetylbenzo[b]thiophen (0.10 mole) in a mixture of dry benzene (250 ml.) and dry ether (250 ml.) was added dimethylamine (0.20 mole), and the mixture was stirred for 12 hours. Ether (300 ml.) was then added to the reaction mixture which was then washed several times with water to remove the excess of amine and the amine hydrohalide. The reaction mixture was then dried over sodium sulphate, the solvents removed and the product was obtained as an oil. This oil was dissolved in dry ether (500 ml.) and a dry ethereal solution of hydrogen chloride added. After crystallisation from dry ethanol, 3-dimethylaminoacetylbenzo[b]thiophen hydrochloride, m.p. 233°—235°C. (dec.) was obtained.

Anti-5HT activity

This activity was measured in vivo using essentially the method of Woolley, D. W., Proc. Soc. Exp. Biol. Med., 98, 367, (1958). This method measures the reduction of 5-hydroxytryptophan induced diarrhoea in groups of 10 mice caused by the previous intraperitoneal injection of the compound being investigated. The compound of Example I at a dose of 64 mg./Kg. gave 50% protection against such induced diarrhoea. The $LD_{50}$ in mice was found to be 200 mg./Kg.

EXAMPLE 2

The compound of Example 1 was dissolved in methanol (250 ml.) and sodium borohydride (0.05 mole) in water (18 ml.) and aqueous sodium hydroxide (2 ml. of 2 N) was added dropwise at room temperature. The mixture was stirred for 45 minutes after the addition was complete. The methanol was distilled off under reduced pressure and the residue was shaken with water. The product was extracted with ether, the ethereal extracts were dried over sodium sulphate, and after removal of the ether the product, 3-(1'-hydroxy-2'-dimethylaminoethyl) benzo[b]thiophen, was obtained as an oil by distillation under reduced pressure, b.p. 138°–140°C./0.5 mm.Hg.

In the anti-5HT test described in Example 1, this compound at a dose of 16 mg./kg gave 100% protection against induced diarrhoea and was found to have an $LD_{50}$ of 300 mg./Kg.

EXAMPLE 3

The compound of Example 2 (0.05 mole) was added to dry chloroform (400 ml.) and the mixture boiled gently. Thionyl chloride (13.5 g., 0.10 mole of pure reagent) was added dropwise with stirring and the mixture was then boiled for 45 minutes. The chloroform and the excess thionyl chloride were then distilled off under reduced pressure, and the residue dissolved in dry ethanol. On addition of excess dry ether, the product 3-(1'-chloro-2'-dimethylaminoethyl)benzo[b]thiophen m.p. 146°–148°C. was obtained.

In the anti-5HT test described in Example 1, this compound at a dose of 128 mg./Kg. gave 80% protection against induced diarrhoea and was found to have an $LD_{50}$ of 250 mg./Kg.

EXAMPLE 4

3-Piperidinoacetyl benzo[b]thiophen hydrochloride, m.p. 265°–267°C.(dec.) was prepared by the method of Example 1 by reaction of piperidine with 3-chloroacetylbenzo[b]thiophen.

In the anti-5HT test, this compound at a dose of 64 mg./Kg. gave 90% protection against induced diarrhoea and was found to have an $LD_{50}$ of 250 mg./Kg.

EXAMPLE 5

By the method of Example 2, 3-(1'-hydroxy-2'-piperidinoethyl)benzo[b]thiophen, b.p. 160°–162°C./0.4 mm.Hg. was prepared from the compound of Example 4.

In the anti-5HT test, this compound at a dose of 128 mg./Kg. gave 100% protection against induced diarrhoea and was found to have an $LD_{50}$ of 300 mg./Kg.

EXAMPLE 6

3-Bromoacetylbenzo[b]thiophen (0.05 mole) and dibenzylamine (0.10 mole) in dry benzene (500 ml.) were boiled under reflux for 90 minutes. After cooling, dibenzylamine hydrobromide was filtered off and the benzene was distilled off under reduced pressure. The residue was shaken with ether (300 ml.) and filtered to remove more dibenzylamine hydrobromide, the total yield of which indicated the degree of completeness of the reaction. The 3-dibenzylaminoacetylbenzo[b]thiophen was obtained as a solid by removing the ether and was crystallised from light petroleum. The solid melted at 82°C. The hydrochloride, m.p. 188°C., was obtained by the addition of a dry ethereal solution of hydrogen chloride to a solution of the base in dry ether.

In the anti-5HT test, the hydrochloride at a dose of 16 mg./Kg. gave 70% protection against induced diarrhoea and was found to have an $LD_{50}$ of 150 mg./Kg.

EXAMPLE 7

By the method of Example 2, 3-(1'-hydroxy-2'-dibenzylaminoethyl)benzo[b]thiophen hydrochloride, m.p. 196°C.(dec.) was prepared by reduction of the compound of Example 6.

In the anti-5HT test, this compound at a dose of 16 mg./Kg. gave 90% protection against induced diarrhoea and was found to have an $LD_{50}$ of greater than 500 mg./Kg.

EXAMPLE 8

3-(1',2'-Epoxyethyl)benzo[b]thiophen (0.10 mole) and pyrrolidine (0.2 mole) in dry benzene (150 ml.) was allowed to stand at room temperature for 2 hours. The benzene solution was washed thoroughly with water to remove excess pyrrolidine and dried over magnesium sulphate. Addition of ethereal hydrogen chloride precipitated 3-(1'-hydroxy-2'-pyrrolidinoethyl)-benzo[b]thiophen hydrochloride, m.p. 174°–175°C.

In the anti-5HT test, the free base of this compound (m.p. 83°–84°C.) at a dose of 64 mg./Kg. gave 70% protection against induced diarrhoea and was found to have an $LD_{50}$ of 300 mg./Kg.

In the following Examples 9 to 30, details of other useful compounds of the invention having low toxicities are given. The compounds were made by the methods described in Examples 1,2,3 and 7.

EXAMPLE 9

3-Diethylaminoacetyl benzo[b]thiophen hydrochloride, m.p. 203°–205°C. dec.

EXAMPLE 10

3-Pyrrolidinoacetyl benzo[b]thiophen hydrochloride, m.p. 252°–253°C. dec.

EXAMPLE 11

3-Morpholinoacetyl benzo[b]thiophen hydrochloride, m.p. 228°C. dec.

EXAMPLE 12

3-(1'-Hydroxy-2'-diethylaminoethyl)benzo[b]thiophen hydrochloride, m.p. 122°–124°C.

EXAMPLE 13

3-(1'-Hydroxy-2'-morpholinoethyl)benzo[b]thiophen hydrochloride m.p. 189°–190°C.

EXAMPLE 14

2-(1'-Hydroxy-2'-dimethylaminoethyl)-5-chlorobenzo[b]thiophen, m.p. 201°–202°C.

EXAMPLE 15

2-(1'-Hydroxy-2'-dimethylaminoethyl)-5-bromobenzo[b]thiophen, m.p. 186°–187°C.

EXAMPLE 16

2-(1'-Hydroxy-2'-diethylaminoethyl)-5-chlorobenzo[b]thiophen hydrochloride m.p. 159°–160°C.

EXAMPLE 17

2-(1'-Hydroxy-2'-pyrrolidinoethyl)-5-chlorobenzo[b]thiophen hydrochloride m.p. 116°–177°C.

EXAMPLE 18

2-(1'-Hydroxy-2'-morpholinoethyl)-5-chlorobenzo[b]thiophen hydrochloride, m.p. 224°–225°C.

EXAMPLE 19

2-(1'-Hydroxy-2'-dibenzylaminoethyl)-5-chlorobenzo[b]thiophen hydrochloride, m.p. 215°–216°C.

EXAMPLE 20

2-(1'-Chloro-2'-dimethylaminoethyl)-5-chlorobenzo[b]thiophen hydrochloride m.p. 165°–166°C.

EXAMPLE 21

2-(1'-Chloro-2'-pyrrolidinoethyl)-5-chlorobenzo[b]thiophen hydrochloride m.p. 166°–167°C.

EXAMPLE 22

2-(1'-Chloro-2'-morpholinoethyl)-5-chlorobenzo[b]thiophen hydrochloride, m.p. 180°–181°C.

EXAMPLE 23

2-(1'-Hydroxy-2'-diethylaminoethyl)-5-bromobenzo[b]thiophen hydrochloride m.p. 138°–139°C.

EXAMPLE 24

2-(1'-Hydroxy-2'-pyrrolidinoethyl)-5-bromobenzo[b]thiophen hydrochloride m.p. 224°–224°C.

EXAMPLE 25

2-(1'-Hydroxy-2'-piperidinoethyl)-5-bromobenzo[b]thiophen hydrochloride m.p. 228°–229°C.

EXAMPLE 26

2-(1'-Hydroxy-2'-morpholinoethyl)-5-bromobenzo[b]thiophen hydrochloride m.p. 228°–229°C.

EXAMPLE 27

2-(1'-Hydroxy-2'-dibenzylaminoethyl)-5-bromobenzo[b]thiophen hydrochloride m.p. 221°–222°C.

EXAMPLE 28

2-(1'-Chloro-2'-dimethylaminoethyl)-5-bromobenzo[b]thiophen hydrochloride m.p. 173°–174°C.

EXAMPLE 29

2-(1'-Chloro-2'-pyrrolidinoethyl)-5-bromobenzo[b]thiophen hydrochloride m.p. 163°–164°C.

EXAMPLE 30

2-(1'-Chloro-2'-morpholinoethyl)-5-bromobenzo[b]thiophen hydrochloride m.p. 174°–174°C.

As described in Example 1, the following compounds were made by reaction of the corresponding 2-bromoacetylbenzo[b]thiophen with the required amine:-

2-Dimethylaminoacetyl-5-chlorobenzo[b]thiophen;
2-Diethylaminoacetyl-5-chlorobenzo[b]thiophen;
2-Pyrrolidinoacetyl-5-chlorobenzo[b]thiophen;
2-Morpholinoacetyl-5-chlorobenzo[b]thiophen;
2-Dibenzylaminoacetyl-5-chlorobenzo[b]thiophen;
2-Dimethylaminoacetyl-5-bromobenzo[b]thiophen;
2-Diethylaminoacetyl-5-bromobenzo[b]thiophen;
2-Pyrrolidinoacetyl-5-bromobenzo[b]thiophen;
2-Piperidinoacetyl-5-bromobenzo[b]thiophen;
2-Morpholinoacetyl-5-bromobenzo[b]thiophen;
2-Dibenzylaminoacetyl-5-bromobenzo[b]thiophen.

PREPARATION OF STARTING MATERIALS FOR THE FOREGOING EXAMPLES

EXAMPLE A

3-Acetylbenzo[b]thiophen

Benzo[b]thiophen (100 g., 0.75 mole) and freshly distilled acetyl chloride (51 ml., 0.72 mole) in pure dry carbon disulphide (100 ml.) were added dropwise with vigorous stirring to a mixture of fresh, finely divided aluminium chloride (128.6 g., 0.96 mole) and pure dry carbon disulphide (85.0 ml.) cooled to 0°C. in an ice-salt bath. During the addition the temperature was maintained below 10°C. The mixture was then allowed to attain room temperature and was stirred at this temperature overnight.

The reaction mixture was poured on to a mixture of ice and concentrated hydrochloric acid and vigorously stirred to decompose the complex that had formed. The carbon disulphide layer, containing most of the product, was then separated and the aqueous layer was shaken with ether. The combined ethereal and carbon disulphide extracts were dried over sodium sulphate, the solvents were removed, and the product was distilled under reduced pressure to yield 86 g. (70%) of 3-acetylbenzo[b]thiophen, b.p. 112°–115°C./0.05 mm.Hg.

EXAMPLE B

3-Halogenoacetylbenzo[b]thiophens 1. 3-Chloroacetylbenzo[b]thiophen a. Dry chlorine was bubbled for 20 minutes at room temperature through a vigorously stirred solution of 3-acetylbenzo[b]thiophen (39 g., 0.22 mole) in dry carbon tetrachloride (80 ml.) and dry chloroform (80 ml.). The reaction mixture was then concentrated to a volume of about 50 ml. and cooled. The crystals which separated were filtered off to yield 28.5 g. (61%) of 3-chloroacetylbenzo[b]thiophen, which on recrystallisation from benzene-hexane had a melting point of 137°–139°C.

b. To 3-Acetylbenzo[b]thiophen (44 g., 0.25 mole) in pure dry chloroform (400 ml.) heated under reflux was added sulphuryl chloride (33.8 g., 0.25 mole). The mixture was boiled for two hours and was then concentrated to a volume of about 50 ml. whereupon the major part of the product separated in a state of high purity. More product was obtained by distilling off all the chloroform under reduced pressure and triturating the residue with light petroleum (b.p. 60°–80°C). A final yield of 38.4 g. (73%) was obtained.

2. 3-Bromoacetylbenzo[b]thiophen

A solution of bromine (80 g., 0.50 mole) in pure dry carbon tetrachloride (800 ml.) was added to 3-acetylbenzo b thiophen (88 g., 0.5 mole) in pure dry carbon tetrachloride (800 ml.) at 60°C. at such a rate that the mixture boiled gently. After the addition was complete, the mixture was boiled for one hour and was then concentrated to a volume of about 100 ml. On being cooled, most of the product separated in a state of high purity. The remaining 3-bromoacetylbenzo[b]thiophen was obtained by removing all the solvent and by triturating the residue with light petroleum (b.p. 60°–80°C). The material so obtained was crystallised from benzene.

Several recrystallisations from benzene yielded 106.5 g. (84%) of white crystals of 3-bromoacetylbenzo[b]thiophen, m.p. 139°–140°C.

EXAMPLE C

5-Chloro-or 5-bromo-2-chlorocarbonylbenzo[b]thiophen

A mixture of 5-chloro- or 5-bromo-benzo[b]thiophen-2-Carboxylic acid (100 g.) and thionyl chloride (200 ml.) was refluxed for 3 hours. The dark red solution was diluted with dry benzene and treated with charcoal. Removal of the solvent and excess of thionyl chloride gave a dark coloured solid which was crystallised from benzene - light petroleum (b.p. 40°–60°C.) as colourless needles. The 5-chloro compound melted at 90°–91°C. whilst the 5-bromo compound melted at 93°–94°C.

EXAMPLE D

2-Acetyl-5-halogenobenzo[b]thiophens

A stirred mixture of magnesium turnings (6.0 g.), dry ethanol (6 ml.) and carbon tetrachloride (0.5 ml.) was warmed and dry ether (50 ml.) was gradually added. A solution of diethyl malonate (40 g.) in dry ethanol (22 ml.) and dry ether (25 ml.) was added so that rapid boiling was maintained and the mixture was then heated for 3 hours. The required 5-halogeno-2-chlorocarbonylbenzo[b]thiophen (53 g.) in dry ether (250 ml.) was added during 30 minutes and heating and stirring were continued for a further 2 hours. Dilute sulphuric acid (30 g. concentrated $H_2SO_4$ in 200 ml. water) was added to the cooled reaction mixture and the ethereal layer was separated. The acidic layer was shaken with more ether and the combined ethereal solutions were evaporated to give a yellow oil which was mixed with glacial acetic acid (70 ml.), concentrated sulphuric acid (9 ml.) and water (45 ml.) and the mixture refluxed for 4 hours. The cooled reaction mixture was shaken with benzene and the benzene layer washed with 10% sodium hydroxide solution. The benzene solution was passed down an alumina column to remove coloured impurities and evaporation of the solvent gave the required product which crystallised from ethanol (ether/tetrahydrofuran in the case of the 5-bromo compound) as colourless needles. The 5-chloro compound melted at 93°–94°C. whilst the 5-bromo compound melted at 112°–113°C.

EXAMPLE E

2-Bromoacetyl-5-halogenobenzo[b]thiophens

Bromine (53.3 g., 0.33 mole) in pure dry carbon tetrachloride (200 ml.) was added during 1 hour to a stirred solution of the required 2-acetyl-5-halogenobenzo[b]thiophen (70 g., 0.33 mole) in dry carbon tetrachloride (800 ml.) at room temperature. The mixture was then boiled for 1 hour and concentrated to about 100 ml. Most of the product separated from the cooled solution and the rest was obtained by evaporating all the solvent and triturating the residue with a little benzene. Crystallisation from benzene yielded the required product as colourless needles. The 5-chloro compound melted at 162°–163°C. whilst the 5-bromo compound melted at 158°–159°C.

EXAMPLE F

5-Halogeno-2-(1',2'-epoxyethyl)benzo[b]thiophens

The required 2-bromoacetyl-5-halogenobenzo[b]thiophen (0.05 mole) was suspended in methanol (100 ml.) and sodium borohydride (0.95 g., 0.025 mole) in water (18 ml.) and aqueous 2 N-sodium hydroxide (25 ml.) was added dropwise at room temperature. The mixture was stirred for 1 hour and the solvents were removed under reduced pressure. The residue was taken up in water and the product was extracted with ether and dried over magnesium sulphate. Removal of the ether gave a solid which was crystallised from ethanol as colourless crystals. The 5-bromo- and 5-chloro-2-(1',2'-epoxyethyl)benzo[b]thiophens melted respectively at 77°–78° and 87°–88°C.

EXAMPLE G 3-(1',2'-epoxyethyl)benzo[b]thiophen

3-Bromoacetylbenzo[b]thiophen (17.5 g.) was stirred in methanol (100 ml.) containing a few drops of concentrated sodium hydroxide, and sodium borohydride (2.6 g.) in water (20 ml.) was added slowly. The solution was boiled under reflux for one hour and then poured into water, and the product extracted with ether. The extract was dried with sodium carbonate and distilled to give a pale yellow oil (4.5 g.) of b.p. 80°–82°C./$10^{-3}$ mm.

The following Examples illustrate pharmaceutical formulations for use in accordance with the present invention.

EXAMPLE 31

Tablets containing 20 mg. of the compound of Example 2 are made as follows:-

| | |
|---|---|
| Compound of Example 2 | 20.0 mg. |
| Lactose | 187.5 mg. |
| Maize starch (i) | 20.0 mg. |
| Maize starch as a 1 in 10 paste with water (ii) | 10.0 mg. |
| Maize starch (iii) | 10.0 mg. |
| Magnesium Stearate | 2.5 mg. |

The lactose and starch (i) are passed through a 44 mesh B.S.S. screen and mixed thoroughly. The starch paste (ii) is used to granulate the mixture and the granules are passed through a 12 mesh B.S.S. screen. The granules are then dried at 40°C. and passed through a 16 mesh B.S.S. screen. The starch (iii), compound of Example 2 and the magnesium stearate are passed through a 60 mesh B.S.S. screen, added to the granules and mixed thoroughly. The resultant granules are then compressed to a tablet weight of 250 mg.

Such tablets are useful for administration to humans suffering migraine and/or hypertension. A dosage of from 250 to 500 mg. per day of active ingredient may be administered without noticeable toxic effects.

EXAMPLE 32

Tablets containing 100 mg. of the compound of Example 3 are made as in Example 31 except that 257.5 mg. of lactose were used and the final weight of tablet was 400 mg. Such tablets are useful for administration to humans suffering migraine and/or hypertension. Dosages as detailed in Example 31 may be administered without noticeable toxic effects.

Similarly tablets containing any other active compound of formula I may be administered in like manner for the treatment of like conditions.

EXAMPLE 33

Sterile powders containing 50 mg. of the compound of Example 4 are made as follows:-

A 0.5% w/v solution of the compound of Example 4 is prepared in distilled water and filtered through a bacterial proof filter into a sterile container. 10 ml. quantities (i.e. 50 mg. of active ingredient) are distributed aseptically into sterile ampoules which are freeze dried and hermetically sealed under aseptic conditions.

This sterile powder may be dissolved in 10 ml. or more of sterile water for injection or dissolved in alcohol or sterile 40% w/v propylene glycol just prior to use.

The resultant solution may be administered intravenously or by intra-arterial infusion to humans suffering from extreme hypertension, and up to 500 mg. of active ingredient may be administered without noticeable toxic effects. Similarly any other compound of formula I may be used.

EXAMPLE 34

An ointment containing 0.5% of the compound of Example 5 is prepared as follows:-

| | |
|---|---|
| Compound of Example 5 | 0.5 g |
| Liquid paraffin | 5.0 g. |
| White Soft Paraffin | 94.5 g |

The white soft paraffin and liquid paraffin are melted together using gentle heat and the active ingredient, previously passed through a 60 mesh B.S.S. screen, is suspended in the melted paraffins. The mixture is then stirred until cold to form an ointment which is useful for the treatment of skin allergies. Similarly any other compound of formula I may be formulated and used in this manner.

Example 35

Suppositories containing 200 and 400 mg. of the compound Example 6 are prepared as follows:

| | |
|---|---|
| Compound of Example 6 | 20 g |
| Oil of Theobroma | 80 g |

The active ingredient is passed through a 60 mesh B.S.S. screen and suspended in the theobroma oil previously melted using the minimum amount of heat necessary. The mixture is then poured into suppository moulds of a nominal capacity of 1 g. or 2 g. as desired, to produce suppositories each containing 200 mg. or 400 mg. of active ingredient. These suppositories are useful in the treatment of hypertension and up to 2 g. per day of active ingredient may be administered without toxic side effects being noticed. Similarly any other compound of formula I may be formulated and used in this manner.

EXAMPLE 36

An aerosol was prepared containing the following ingredients:-

| | Quantity per ml. |
|---|---|
| Compound of Example 2 | 2.0 mg. |
| Oleyl alcohol | 6.0 mg. |
| Trichloromonofluoromethane | 562.5 mg. |
| Dichlorodifluoromethane | 829.5 mg. |
| | 1400.0 mg. |

The compound of Example 2 was micronised and added to the required amount of oleyl alcohol and the two stirred for at least 30 minutes. The resultant suspension was passed through a colloid mill at a 5 micron opening. The required amount of this suspension was mixed with the propellants and cooled to minus 20°–30°F. The mixture was filled into stainless steel containers and the valve units fitted and sealed to the container. These valve units may be equipped with a metering device so that approximately 0.15 mg. of active ingredient is released by a single actuation of the valve. This formulation is particularly useful in the treatment of allergic asthma.

Having regard to the foregoing disclosure, the following is claimed as the inventible and patentible embodiments thereof:

1. A compound having the formula

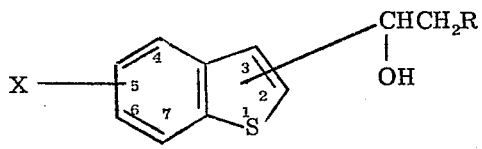

wherein X is selected from the group consisting of hydrogen, chlorine and bromine, and R is selected from the group consisting of piperidino and pyrrolidino.

2. A compound in accordance with claim 1, having the structure 3-(1'-hydroxy-2'-piperidinoethyl)benzo[b]thiophen.

3. A compound in accordance with claim 1, having the structure 3-(1'-hydroxy-2'-pyrrolidinoethyl)benzo[b]thiophen.

4. A compound in accordance with claim 1, in which R is pyrrolidino.

5. A compound in accordance with claim 4, in which X is in the 5-position.

6. A compound in accordance with claim 1, in which R is piperidino.

7. A compound in accordance with claim 6, in which X is in the 5-position.

8. A compound in accordance with claim 1, in which X is hydrogen, and $CH_{OH}$ $CH_2R$ is in the 3-position.

9. A compound in accordance with claim 1, in which X is chlorine or bromine and is in the 5-position.

* * * * *

UNITED STATES PATENT OFFICE
CERTIFICATE OF CORRECTION

Patent No. 3,903,092          Dated September 2, 1975

Inventor(s) Norman B. Chapman et al.

It is certified that error appears in the above-identified patent and that said Letters Patent are hereby corrected as shown below:

Column 4, line 17    :     "($\beta$-naphthyl)" should be --($\alpha$-naphthyl)-- line 21    :     "($\beta$-naphthyl)" should be --($\alpha$-naphthyl)--

Column 5, line 14    :     "salicyclic" should be --salicylic--

Column 15, line 28    :     "Carboxylic" should be --carboxylic--

Column 18, line 20, Example 36 :

EXAMPLE 36

An aerosol was prepared containing the following ingredients:-

| | Quantity per ml. |
|---|---|
| Compound of Example 2 | 2.0 mg. |
| Oleyl alcohol | 6.0 mg. |
| Trichloromonofluoromethane | 562.5 mg. |
| Dichlorodifluoromethane | 829   .5 mg. |
| | 1400.0 mg. | should be

EXAMPLE 36

An aerosol was prepared containing the following ingredients:-

| | Quantity per ml. |
|---|---|
| Compound of Example 2 | 2.0 mg. |
| Oleyl alcohol | 6.0 mg. |
| Trichloromonofluoromethane | 562.5 mg. |
| Dichlorodifluoromethane | 829.5 mg. |
| | 1400.0 mg. |

Signed and Sealed this twentieth Day of April 1976

[SEAL]

Attest:

RUTH C. MASON
*Attesting Officer*

C. MARSHALL DANN
*Commissioner of Patents and Trademarks*